Oct. 18, 1960  J. A. NOLAND, JR  2,956,633
TRACTOR SAFETY SYSTEM
Filed Nov. 21, 1957
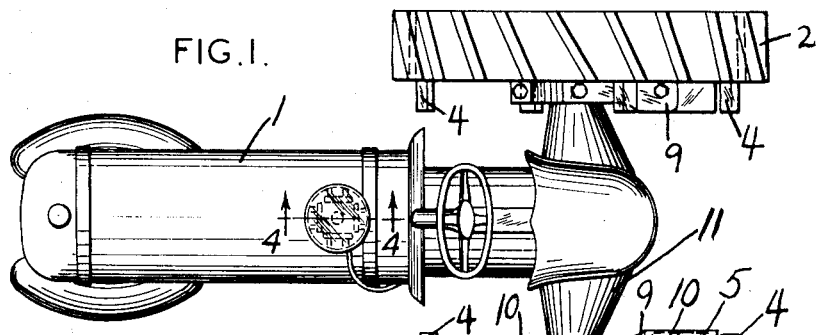
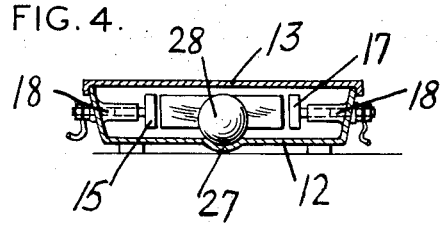
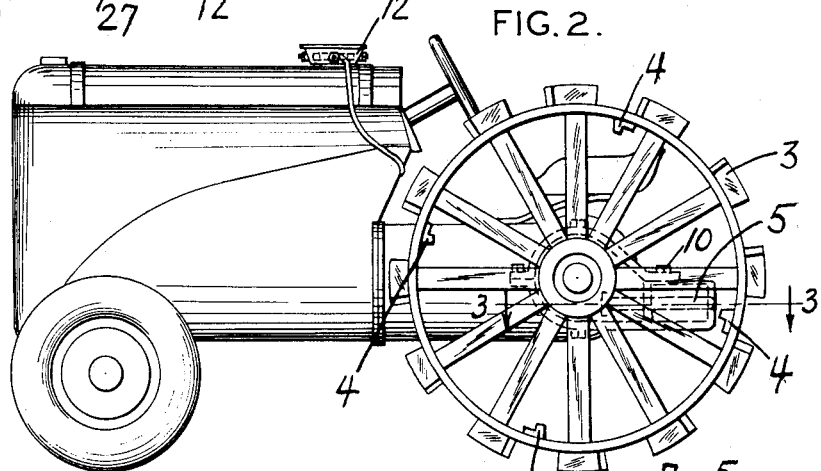
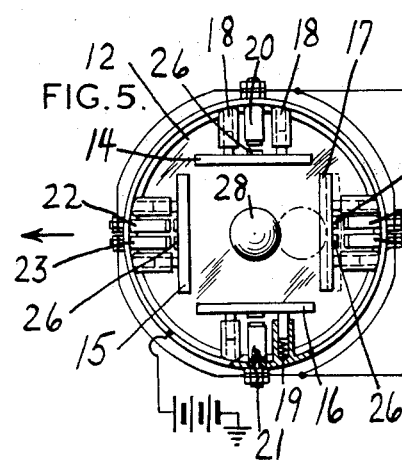
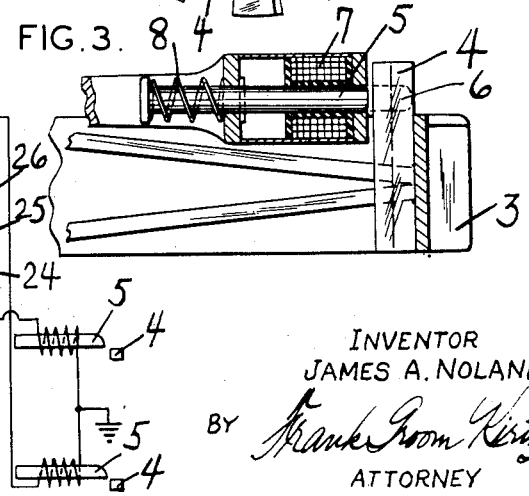
INVENTOR
JAMES A. NOLAND, JR.
BY *Frank Groom Kirtz*
ATTORNEY United States Patent Office 2,956,633
Patented Oct. 18, 1960

2,956,633
TRACTOR SAFETY SYSTEM
James A. Noland, Jr., Macks Creek, Mo.
Filed Nov. 21, 1957, Ser. No. 697,894
2 Claims. (Cl. 180—82)

The primary purpose of my invention is to provide a safety system which will prevent a vehicle such as a tractor from upsetting rearwardly, sidewise or forwardly. Although a tratcor in general is a slow moving vehicle a great many accidents occur, which are of the upsetting variety. This is true, moreover, in spite of the fact that the center of gravity of such vehicles is relatively low and although the vehicles are relatively heavy.

Accidents to such vehicles may be classified in two categories. In the first category are accidents which are due to the unbalanced condition of the tractor itself. By climbing a slope or a grade, or by leaning over to one side at too great an angle, the force of gravity applied to the tractor, upsets the tractor. This is in general a condition which does not happen in an instant, but which gradually is approached, as when the tractor ascends an incline slowly through rotation of its wheels.

In the second category may be classified accidents which are due to unbalanced force moments about the center of gravity of the vehicle. In this category a typical example consists in overloading the tractor heavily. When power is applied to the wheels, the front wheels rise and the moment of the dragging force applied by the load causes the front wheels to leave the ground and the tractor starts to go over backwards. Again, this condition does not happen in an instant, and again it is related to the rotation of the rear wheels through which driving power is applied.

A further object of my invention is to provide a safety system which can be installed on any existing tractor's rear drive wheels.

Another object of my invention is to provide a simple and efficient safety switch which will control or limit the application of power to the rear wheels of the tractor and act to cut off such power when the tractor has tilted in any direction from the horizontal more than a predetermined amount, for example thirty-five degrees.

A further object of my invention is to provide a safety switch which will act, when one wheel of the tractor leaves the ground, to disconnect the flow of power to that wheel and transfer the flow of power to the opposite wheel so as to increase the forces being applied to right the tractor and bring the free wheel back to the ground.

Other objects, purposes and advantages of my invention will become apparent from a perusal of the accompanying drawings, which are illustrative of the ensuing description, wherein like symbols denote like parts and in which, Fig. 1 is a plan view of the tractor,
Fig. 2 is a side elevational view of the tractor safety system,
Fig. 3 is a detail of the cross-section of the solenoid, plunger and cleat,
Fig. 4 is a cross-sectional view of the control switch, and
Fig. 5 is a plan view of the control switch together with a diagram of the electrical connections to the solenoids and plungers.

In Fig. 1 is shown the tractor 1, provided with the customary body, front and rear wheels, steering wheel, and seat. Ordinarily power is only supplied to the rear wheels, 2 and 3 which are individually driven. On the inner periphery of the rim of the two rear wheels I provide a series of cleats numbered 4, 4. I show four of these cleats in Fig. 2, however I prefer to use at least eight of these cleats, spaced equidistantly around the inner periphery of the rim of the wheel. These cleats are mounted integrally upon the rim, either by welding or by bolting them to the said rim, as they are required to receive and absorb considerable forces during the application of braking of these wheels.

Cooperative with the cleats 4 is the plunger 5, which is electromagnetically operated. The plunger 5 is moved into the cleat-interceptive position 6, best shown in Fig. 3, by current flow in the solenoid winding 7. Normally the position of the plunger is maintained away from the cleats by the return spring 8. Plunger 5, solenoid winding 7 and return spring 8 are disposed in the plunger housing 9, which is rigidly attached by the customary bolts 10, to the rear axle housing, 11.

Control of the current to the solenoid winding 7 is derived from the relatively horizontal position of the control switch housing 12, of Figure 4, which is mounted on the hood of the tractor.

The control switch housing 12 is in the form of a truncated cone and is provided with a cover plate or lid 13. Inside the switch housing 12 are mounted four switch push bars, 14, 15, 16, 17. The push bars are in the form of a bar slidably mounted upon two guide rods in the sockets 18, 18. Behind each guide rod in the sockets 18 is a return spring 19. Between the two socket members of each push bar 14 and 16 are disposed the switch members 20 and 21 respectively. Between the socket members of each bar 15 and 17 are two switch members, 22, 23 and 24, 25, respectively. Each switch member is associated with a contact member 26 mounted upon the appropriate push bar. By the electrical wiring connection shown in the diagram of Figure 5, the power derived from the battery depicted, which may be the ordinary tractor starting battery, is employed to actuate the plungers 5 against the cleats 4 on the two rear wheels of the tractor 1.

The switch housing 12 is provided with a central dimple or depression 27. This dimple is best depicted in Figure 4. In the dimple or depression 27 rests the heavy metal ball 28, when the switch housing 12 is approximately horizontal. In operation the housing 12 is mounted in the sense shown in Figure 5. That is, the arrow to the left of the figure points to the front of the tractor 1. The size of the depression 27 is chosen so that a departure of somewhat more than thirty-five degrees from the depicted horizontal condition is required to dislodge the ball 28 from the depression.

If the front of the tractor rises so that the switch housing 12 departs more than the aforementioned thirty-five degrees or so from the horizontal position, the metal ball 28 will be dislodged from its centrally located position and will roll backwards to the dotted line position shown in Figure 5. In this position the heavy metal ball will force the push bar 17 to its dotted line position and close the switch members 24, 25 by means of the two contacts 26. When the switch members are in closed contact, current will flow in both the solenoids mounted on the rear wheels. As the current flows in both solenoid windings surrounding the plunger 5 of Figure 3, they will both be extended to their interceptive positions against the cleats 4 and the tractor drive power on both rear wheels will be nullified rapidly and safely.

However, if the tractor were to start to turn over sidewise, for example, turning over to the right side, the ball would roll toward and against the switch member 20 in Figure 5. In this condition the left wheels of the tractor would leave the ground. The left rear wheel would continue to spin, driven by power from the axle. The ball 28 however, would close the contact 26 on the push bar 14 against the switch member 20. In this case the lower plunger in Figure 1 would be extended to its cleat-interceptive position. This plunger is the plunger mounted on the left rear wheel, the one which has left the ground. All driving power would consequently be transferred to the right rear wheel and the tractor will automatically right itself.

In a similar manner it will be seen that if the right rear wheel leaves the ground, that is, the right side of the tractor begins to rise, the ball 28 will roll toward and lodge against the push bar 16. Push bar 16 controls the upper plunger in Figure 1, the plunger which is mounted on the right rear wheel, thereby transferring the entire driving power to the wheel remaining on the ground. This driving wheel will be the left wheel which will automatically right the tractor.

It will be noted that the connections of the diagram of the electrical circuit are arranged so that there is accomplished an automatic shifting of power drive to the wheel which will right the unbalanced condition of the tractor.

In the event that the tractor would begin to run into a ditch, the front wheels would begin to drop and the ball 28 would run forward against the push bar 15. This push bar similarly controls the power to both rear wheels. The power would immediately stop and the tractor rear wheels would not turn to drive the tractor into the ditch.

In practice I have found it more advantageous to employ two plungers on each wheel, which simultaneously project to intercept the cleats 4 on the wheel. I mount them apart one hundred and eighty degrees so that they are oppositely disposed on the tractor wheel. In this manner less strain is imposed upon the single plunger to stop the rotation of the wheel. It will be obvious that the more plungers employed to intercept the cleats in rotation, the less wear will be produced upon the individual plunger.

I also contemplate using a magnetic brake, acting on the steel wheel of the tractor. Brake shoes of the customary design used in automobiles or disc brakes, working against a solid disc wheel, as on some modern tractors, would both perform satisfactorily with the present invention. Control of the switches by the metal ball 28 will operate a magnetic brake similarly.

Although the drawings and the above specification disclose the best modes in which I have contemplated embodying my invention, for the further practical application of my invention many changes in the form and construction thereof may be made as circumstances require or experience suggests without departing from the spirit of the invention as expounded within the scope of the appended claims.

What I claim is:

1. In a tractor safety system upon a tractor having independently driven rear wheels mounted upon an axle carried in a housing, a plurality of cleats mounted integrally upon and around the periphery of said wheels, a plunger mounted upon said housing, a solenoid operative upon each wheel to move said plunger into cleat-interceptive position to act as a brake to said wheel and a control switch containing a housing plate having a centrally located depression and four rigidly mounted slidable contact bars and a metal ball in said depression, said switch mounted in a horizontal position relative to the longitudinal axis of the tractor to control the flow of current to said solenoid when the control switch departs more than an established number of degrees from its relatively horizontal position and said metal ball leaves said depression and closes said contact bars when lodged against them.

2. A device of the class described in claim 1, but further characterized in that the control switch consists of four rigidly mounted slidable contact bars, and a metal ball in said depression and having sufficient inertia to leave said depression and close said contact bars when lodged against them, by movement of the housing plate of said control switch.

References Cited in the file of this patent

UNITED STATES PATENTS

| | | |
|---|---|---|
| 1,107,245 | Bard | Aug. 18, 1914 |
| 1,662,979 | Nelson | Mar. 20, 1928 |
| 1,880,129 | Gattie | Sept. 27, 1932 |
| 2,202,043 | Cale | May 28, 1940 |
| 2,365,262 | Gair | Dec. 19, 1944 |
| 2,428,029 | Katcher | Sept. 30, 1947 |
| 2,757,749 | Cooper et al. | Aug. 7, 1956 |